United States Patent [19]

Mueller

[11] 4,352,849
[45] Oct. 5, 1982

[54] COEXTRUDED, HEAT-SHRINKABLE, MULTI-LAYER, POLYOLEFIN PACKAGING FILM

[75] Inventor: Walter B. Mueller, Taylors, S.C.

[73] Assignee: W. R. Grace & Co., Duncan, S.C.

[21] Appl. No.: 247,955

[22] Filed: Mar. 26, 1981

[51] Int. Cl.³ ............................................. B32B 7/02
[52] U.S. Cl. ................................. 428/213; 428/516; 428/520; 428/910
[58] Field of Search ............... 428/215, 500, 516, 518, 428/520, 521, 213; 525/222

[56] References Cited
U.S. PATENT DOCUMENTS
4,194,039 3/1980 Mueller ........................... 428/213
4,277,578 7/1981 Yoshimura et al. ................. 525/222

*Primary Examiner*—George F. Lesmes
*Assistant Examiner*—B. K. Johnson
*Attorney, Agent, or Firm*—John J. Toney; William D. Lee, Jr.; Joe Harps

[57] ABSTRACT

The multi-layer polyolefin shrink film of this invention provides a unique combination of shrink tension, optical clarity, cuttability, sealability, shrink temperature range, and tear resistance which is highly desirable for many packaging applications. The preferred film has three layers in which the core layer comprises an ethylene-vinyl acetate copolymer blended with an ethylene-propylene copolymer and each surface layer comprises an ethylene-propylene copolymer.

8 Claims, No Drawings

COEXTRUDED, HEAT-SHRINKABLE, MULTI-LAYER, POLYOLEFIN PACKAGING FILM

FIELD OF THE INVENTION

This invention relates to heat shrinkable, thermoplastic packaging films; and in particular, this invention relates to a multilayer, pololefin shrink film.

BACKGROUND OF THE INVENTION

The polyolefins and polyvinyl chlorides can be considered to be the two major families of plastic resins from which the bulk of commercially available shrink films for wrapping purposes are made. Other resin families from which shrink films can be made include the ionomers, polyesters, polystyrenes, and polyvinylidene chlorides. The shrinkable polyolefins currently on the market are mainly monolayer films which include both cross-linked and uncross-linked oriented polyethylene, oriented polypropylene, and oriented ethylene-propylene copolymers. The polyvinyl chloride (hereinafter "PVC") shrink films are monolayer films consisting of a variety of formulations of polyvinyl chloride.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the countour of the product and which is aesthetically pleasing while providing the useful functions required of packaging materials such as protection of the product from loss of components, pilferage, or damage due to handling and shipment. Typical items wrapped in PVC or polyolefin shrink films are toys games, sporting goods, stationery, greeting cards, hardware and household products, office supplies and forms, foods, phonograph records, and industrial parts.

The manufacture of shrink films requires sophisticated equipment including extrusion lines with "racking" capability, irradiation units when cross-linking is desired, tenter frames, mechanical centerfolders, and slitters. "Racking" or "tenter framing" are orientation processes which cause the material to be stretched in the cross or transverse direction and in the longitudinal or machine direction. The films are usually heated to their orientation temperature range which varies with the different polymers but is usually above room temperature and below the polymer's melting temperature. After being stretched, the film is rapidly cooled to quench it thus freezing the molecules of the film in their oriented state. Upon heating, the orientation stresses are relaxed and the film will begin to shrink back to its original, unoriented dimension.

The PVC and polyolefin families of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to tear apart), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions). Film characteristics play an important role in the selection of a particular film and may differ for each type of packaging application and for each packager. Consideration must be given to the product's size, weight, shape, rigidity, number of product components, other packaging materials which may be used along with the film, and the type of packaging equipment available.

Polyolefins have been most successful with applications where moderate to high shrink tensions are preferred; and, on new, automatic, high speed shrink wrapping equipment where shrink and sealing temperature ranges are more closely controlled. The polyolefins tend to be cleaner leaving fewer deposits and less residue thereby extending the life of the equipment and reducing equipment maintenance. The PVC films generally have better optics, lower shrink tensions, and will seal and shrink over much broader temperature ranges than the polyolefins. Polyolefins usually do not emit gases upon sealing, and in this respect, are also cleaner than PVC films.

Heretofore, polyolefins have not been able to penetrate PVC film packaging applications where the products to be packaged require the lower shrink tensions of the PVC film because the products are too fragile for use with polyolefins which possess shrink tensions up to four times those of the PVC films. PVC film is also the shrink film of choice for older, manually operated sealers and semi-automatic wrappers where temperatures are highly variable. Older poorly maintained wrapping equipment of any type usually runs PVC better than present monolayer polyolefins due to the combination of the generally broader shrink and sealing temperature ranges of the PVC films. In addition, products with sharp or pointed extensions will often require PVC as a wrapping film due to the high initial tear resistance of the PVC film relative to that of the polyolefins, i.e. it takes about 7 grams of force to propagate a tear in PVC whereas only 2 to 3.5 grams of force are necessary to propagate a tear in a typical monolayer polyolefin shrink film.

Accordingly, it is a general object of the present invention to provide a shrink polyolefin film that has many of the desirable qualities of PVC films and overcomes many of PVC's limitations.

Specifically, it is an object of the present invention to provide a polyolefin film having shrink tensions approximating those of PVC films and also having good optical qualities, a wide shrink temperature range, sealability, and resistance to tear propagation.

In addition, it is an object of the present invention to provide a polyolefin film which has none of the undesirable qualities of PVC films such as noxious odors and corrosive by-products.

Furthermore, it is an object of this invention to produce a multi-layer film having very thin layers of oriented propylene homopolymers or copolymers.

These and other objects are achieved by the multi-layer polyolefin shrink film which is disclosed herein.

SUMMARY OF THE INVENTION

It has been surprisingly discovered that a flexible thermoplastic packaging film having a unique combination of shrink tension, optical clarity, cuttability, sealability, shrink temperature range, and tear resistance heretofore unobtainable in a monolayer polyolefin film is achieved by the multi-layer, flexible, thermoplastic, packaging film of the present invention. This multi-layer film has a "core" layer that comprises an ethylene-vinyl acetate copolymer blended with an ethylenepropylene copolymer and a "surface" or "skin" layer, each surface layer comprising a copolymer of propylene. The multi-layer film is oriented so that it is heat shrinkable in at least one direction, the preferred stretching range ratios being from 4:1 (transverse)×4:1 (longitudinal) to 7:1 (transverse)×7:1 (longitudinal).

The vinyl acetate content of the ethylene-vinyl acetate copolymer in the core layer is preferably between 4% and 18% by weight and comprises about 50 to 95% by weight of the blend. The core layer thickness is 80% to 30% of the total thickness of the multi-layer film whose total thickness ranges from 0.5 to 1.5 mils.

The preferred material for the balance of the core blend and for the surface layer is ethylene-propylene copolymer with an ethylene content of 1% to 6% by weight.

DEFINITIONS

Unless specifically set forth and defined or limited, the term "polymer" as used herein generally includes homopolymers, copolymers, terpolymers, block, graft polymers, random, and alternating polymers.

The term "melt flow" as used herein or "melt flow index" is the amount, in grams, of a thermoplastic resin which can be forced through a given orifice under a specified pressure and temperature within 10 minutes as described in ASTM D 1238.

The term "oriented" or "orientation" as used herein means the alignment of the molecules of a polymer predominately in a particular direction. "Orientation" is used interchangeably with "heat shrinkability" herein and designates a material which has been stretched and set at its stretched dimensions and which will tend to return to its original dimensions when heated to a specific temperature below its melting temperature range.

The term "core" or "core layer" as used herein means a layer in a multi-layer film which is enclosed on both sides by additional or auxiliary layers. The core may be either "hot blown" or "oriented".

The term "hot blown" as used herein means that the material referred to has been stretched at or above its melting temperature range so that the stretching has induced a minimum of stresses and molecular orientation. Such a material is not considered to be "heat shrinkable" as it will have very low shrink tension.

"Skin" or "surface" layers are outer layers which are oriented and contribute to the shrink properties of the film.

DISCLOSURE STATEMENT

Closely related patents are listed and discussed briefly in the paragraphs which follow:

(1) U.S. Pat. No. 3,381,717 issued on May 7, 1968 to Frederick S. Tyrrel and discloses a blown polypropylene tubular film wherein the core or center layer comprises an ethylene vinyl acetate copolymer and the outer layers constitute a block copolymer of propylene and butylene. U.S. Pat. No. 3,595,735 which issued on July 27, 1971 also to Frederick S. Tyrrel discloses a similar multi-layer structure but the outer layers constitute linear polyethylene.

(2) U.S. Pat. No. 3,620,825 issued on Nov. 16, 1971 to Harold Lohman et al and discloses a biaxially oriented film of isotactic polypropylene with at least one surface coated with a blend of isotactic and non-isotactic polypropylene or a propylene-ethylene copolymer.

(3) U.S. Pat. No. 3,817,821 which issued on June 18, 1974 to J. B. Gallini shows a three layer laminar, sealable, packaging film wherein the first layer is a blend of ethylene vinyl acetate copolymer with a second ethylene vinyl acetate copolymer or polybutene-1; the next or core layer consists of high density polyethylene; and the third layer is a blend of high density polyethylene and ethylene vinyl acetate copolymers.

(4) U.S. Pat. No. 3,821,182 issued on June 28, 1974 to William G. Baird, Jr. and discloses a method of extruding a three ply material from a die wherein saran is the center layer and the outer layers are polyethylene. This three ply material may be irradiated, biaxially oriented, and then the outer polyethylene layers stripped away to provide a saran film with a smooth surface.

(5) In tables entitled "Properties of specialty films" and "Shrink and stretch film properties" on Pages 37 and 39 of *Modern Packaging Encyclopedia,* December 1977 a coextruded ethylene-vinyl acetate/polypropylene laminate and a coextruded polyethylene/polypropylene/low density polyethylene/polypropylene/low density polyethylene laminate is disclosed as having been stretched but as having no heat shrinking characteristics. Shrink characteristics of monolayer polyolefins such as polyethylene, polypropylene, and ethylene-vinyl acetate copolymer are listed as well as the properties of polyvinyl chloride.

(6) On page 38 of *Modern Plastics* Magazine for February 1981 a shrink film having layers of ethylene-propylene copolymer blended with polystyrene coextruded with ethylene-propylene copolymer layers is disclosed.

(7) U.S. Pat. No. 4,194,039 issued to Walter B. Mueller on Mar. 18, 1980 discloses a film structure in which skin layers comprise ethylene-propylene copolymer and the core layer comprises ethylene-vinyl acetate copolymer alone or with a blend of ethylene-butylene copolymer.

PREFERRED EMBODIMENT

The preferred embodiment of the subject invention is a three layer, coextruded polyolefin packaging film having a core layer and skin or surface layers which can be illustrated simply and schematically as follows:

skin/core/skin

The preferred core layer comprises an ethylene-vinyl acetate copolymer (hereinafter designated "EVA") having a vinyl acetate content of about 12% by weight having a melt index of 0.3 blended with an ethylene-propylene copolymer (hereinafter designated "EP") having about 2.7 to 3.0% ethylene by weight with a melt index of 2.3. About 90% by weight of the blend is EVA and the remaining portion is EP.

The skin layer may comprise the same EP copolymer as the core but slip and anti-block agents which are well known in the art can be added in minor amounts to enhance machineability and handling.

The core blend of 90% EVA with 10% EP has been found to give the best combination of shrink properties, machineability and processability. If the EP content is dropped, particularly if it is less than 5%, the film becomes too soft to extrude and rack (see process description below) at commercially acceptable rates and thin films, especially, those films that approach total thicknesses of 0.5 mil or less cannot be produced for all practical purposes. On the other hand, if the core blend approaches and exceeds 50% EP, optical problems occur and the film loses its clarity. In addition, in preparing the film it has been found that a layer thickness ratio of 1/3/1 provides the most satisfactory combination of the properties of the core material with that of the skin layer for the core with 5% to 50% EP.

In the preferred process for making the multi-layer, polyolefin shrink film of the present invention the basic steps are blending the polymers for the layers, coextruding the layers to form multi-layer film, and then stretching the film to biaxially orient it.

The process begins by blending the raw materials or polymeric resins in the proportions desired, namely, for the core layer, 90% by weight of ethylene-vinyl acetate copolymer is blended with 10% by weight of ethylene-propylene copolymer. The resin is usually purchased from a supplier in pelletized form and can be blended in any one of a number of commercially available blenders as are well known in the art. In the blending process any additives necessary for special properties may be added such as plasticizers, slip agents, anti-block agents, or anti-static compound.

The blended resins are fed into the hoppers of extruders which feed coextrusion dies. For the three layer film, three extruders are employed to feed the coextrusion die. Two extruders are fed ethylene-propylene copolymer for the two skin layers and the other extruder is fed the blend of ethylene-vinyl acetate copolymer with ethylene-propylene copolymer. Preferably the materials are coextruded as concentric tubing having a diameter which is dependent on the racking ratio and desired final diameter. This coextruded tube is relatively thick and is referred to as the "tape." Circular coextrusion dies are well known in the art and can be purchased from a number of manufacturers. In addition to tubular coextrusion, slot dies could be used to coextrude the material in sheet form; or single or multi-layer extrusion coating could be employed.

Following coextrusion the extruded tape is heated and is continuously inflated by air pressure into a bubble thereby transforming the arrow tape with thick walls into wide tubing with thin walls of the desired film thickness. This process is sometimes referred to as the "trapped bubble technique" of orientation or as "racking." After stretching, the bubble is then deflated and the film is wound onto semifinished rolls called "mill rolls." The racking process orients the film, stretching it transversely and longitudinally thereby rearranging the molecules, to impart shrink capabilities to the film and to modify physical characteristics. In the present invention the racking temperature is above the melting temperature of the EVA in the core as the oriented layers are the ethylene-butylene copolymer layers which form the skin layers. Thus, in the racking process the core layer is hot stretched or hot blown and the skin layers are biaxially oriented. It is believed that the hot blown core layer provides a moderating or damping effect on the rather strong shrink properties of the ethylene-propylene layers. In addition, by this process ethylene-propylene copolymer layers that are very thin are oriented.

It is desirable that the preferred embodiment be prepared by a coextrusion process as described above wherein the layers are melt joined without adhesive materials interposed between the layers.

In Table I below properties of the preferred embodiment are listed for comparison with properties of similar films without the EP blended in the core layer and for comparison with PVC:

TABLE I

| Example | Preferred Embodiment | EP/EVA/EP | EP/EVA/EP | PVC |
|---|---|---|---|---|
| Layer ratio | 1/3/1 | 1/3.5/1 | 1/4/1 | Monolayer |
| Tensile strength[1] × 100 (PSI) | | | | |
| MD | 92 | 90 | 103 | 113 |
| TD | 70 | 30 | 98 | 121 |
| Tear Propagation (gms)[2] | | | | |
| MD | 3.66 | 3.79 | 4.21 | 2.84 |
| TD | 5.13 | 3.62 | 5.01 | 2.45 |
| Optics:[3] | | | | |
| Haze (%) | 2.9 | 1.8 | 1.8 | 2.0 |
| Gloss (%) | 85 | 87 | 87 | 90 |
| Total Transmission (%) | 92.6 | 92.4 | 92.3 | 91.9 |
| Shrink Tension[4] Range (PSI) | 215–285 | 215–315 | 270–365 | 160–250 |

$$\frac{M + T}{2}$$

[1] ASTM D882
[2] ASTM D1938
[3] ASTM D1003
[4] ASTM D2838

In Table I "MD" is for machine direction and "TD" is for transverse direction, machine direction being the direction in which the material flows as it leaves the extruder.

As can be seen the properties of the preferred embodiment compare well with those of PVC and the inclusion of EP in the core blend significantly and surprisingly improves properties. Most important, however, is the fact the EP is necessary for adequate processability and machineability.

In addition to the three layer construction of the preferred embodiment, other multi-layer constructions may be extruded as schematically represented below:

| (a) | Preferred Embodiment: (three layers) | EP/Blend/EP |
|---|---|---|
| (b) | Five layers: | EP/Blend/EP/Blend/EP |
| (c) | Seven layers: | EP/Blend/EP/Blend/EP/Blend/EP |

In the representation above "Blend" is for the blend of EVA with EP. In the five and seven layer structures the layer ratios should remain close to the preferred or 1/3/1 or 3:2 for Total Blend to Total EP thicknesses, i.e., the core is about 60% of the Total thickness. However, this can vary from 80% to 30% of the total thickness within the scope of the invention, the core thickness being less as the proportion of EP in the core increases and the vinyl acetate content of the EVA increases.

EP copolymer is required as the skin layer material rather than propylene homopolymer because the homopolymer has too high a melting point with too high a shrink temperature range to be a satisfactory material for the packaging applications for which the subject invention is useful.

As the percentage of ethylene in the EP copolymer is increased, from 2.7–3.0% to 3.5–4.0%, the proportion of EP in the blend may be increased with satisfactory results. Below 3.0% ethylene content EP and EVA exhibit incompatibility. At about 3.5% ethylene content in the EP miscibility appears to occur with a significant increase in optical properties. For example, a multi-layer film according to this invention having a core blend of 50% EVA and 50% EP with 3.5–4.0% ethylene content could be expected to have commercially acceptable optical properties. Thus, the use of EP having 3.5 to 4.0% ethylene in the core blend and the use of EP having 2.7% to 3.0% ethylene as the skin layer will produce an excellent multi-layer shrink film. Other desirable combinations can be projected within the scope of the invention.

Having thus described my invention, I claim:

1. A multilayer, heat shrinkable packaging film comprising:
   (a) a core layer consisting essentially of from 5% to 50% by weight of an ethylene-propylene copolymer blended with 95% to 50% by weight of an ethylene-vinyl acetate copolymer wherein the vinyl acetate content of the ethylene-vinyl acetate copolymer is in the range of 4% to 18%; and
   (b) skin or surface layers comprising an ethylene-propylene copolymer, wherein the ethylene content of the ethylene-propylene copolymer in the core blend and the surface layer is in the range of 1% to 6% by weight.

2. The film of claim 1 wherein said layers are melt joined without an adhesive material interposed therebetween.

3. The film of claim 1 wherein the thickness of the core material comprises 80% to 30% of the total thickness of the film.

4. The film of claim 1 wherein:
   (i) the core layer comprises about 60% of the total film thickness;
   (ii) the vinyl acetate content of the ethylene-vinyl acetate copolymer is approximately 12% by weight;
   (iii) the ethylene content of the ethylene-propylene copolymer is 2.7% to 4% by weight;
   (iv) the ethylene-vinyl acetate content of the core layer is about 90% by weight; and
   (v) the layers are melt joined without adhesive interposed therebetween.

5. The film of claim 4 wherein the skin layers are biaxially oriented and the core layer is substantially unoriented.

6. The film of claim 4 wherein the shrink tension range is 215 to 285 p.s.i.

7. The film of claim 1 wherein the ethylene content of the ethylene-propylene copolymer in the core is the same as in the skin layers.

8. The film of claim 1 wherein the ethylene content of the ethylene-propylene copolymer in the core is higher than the ethylene content of the ethylene-propylene copolymer in the skin layers.

* * * * *